United States Patent
Jang et al.

(10) Patent No.: US 9,203,075 B2
(45) Date of Patent: Dec. 1, 2015

(54) BATTERY PACK INCLUDING OVERCURRENT PROTECTOR

(75) Inventors: Soo Yeup Jang, Yuseong-gu Daejeon (KR); Jeon Keun Oh, Seoul (KR); Ji Seok Lee, Incheon (KR); Dong Joo Lim, Anyang-si (KR); Sung Chul Park, Daejeon (KR)

(73) Assignee: SK INNOVATION CO., LTD., Seoul (KR)

( * ) Notice: Subject to any disclaimer, the term of this patent is extended or adjusted under 35 U.S.C. 154(b) by 77 days.

(21) Appl. No.: 14/114,349

(22) PCT Filed: Apr. 27, 2012

(86) PCT No.: PCT/KR2012/003272
§ 371 (c)(1),
(2), (4) Date: Dec. 2, 2013

(87) PCT Pub. No.: WO2012/148209
PCT Pub. Date: Nov. 1, 2012

(65) Prior Publication Data
US 2014/0134464 A1    May 15, 2014

(30) Foreign Application Priority Data
Apr. 28, 2011 (KR) .......................... 10-2011-0039952

(51) Int. Cl.
*H01M 2/34* (2006.01)
*H01M 2/20* (2006.01)
(Continued)

(52) U.S. Cl.
CPC .............. *H01M 2/348* (2013.01); *H01M 2/202* (2013.01); *H01M 2/34* (2013.01); *H01M 10/482* (2013.01); *H01M 2/1061* (2013.01); *H01M 10/425* (2013.01); *H01M 2200/103* (2013.01)

(58) Field of Classification Search
CPC ....................................................... H01M 2/34
See application file for complete search history.

(56) References Cited

U.S. PATENT DOCUMENTS 5,242,767 A * 9/1993 Roback ............... H01M 2/1022
320/114
6,111,387 A * 8/2000 Kouzu ................ H01M 10/613
320/107
(Continued)

FOREIGN PATENT DOCUMENTS

CN        101084592 A    12/2007
JP        2001-57196 A    2/2001
(Continued)

OTHER PUBLICATIONS

JP 2009-231138 MT (2009).*
JP 2010-225449 (MT).*
KR 10-0876456 MT.*
JP 2009-231138MT.*
(Continued)

*Primary Examiner* — Patrick Ryan
*Assistant Examiner* — Alex Usyatinsky
(74) *Attorney, Agent, or Firm* — Hauptman Ham, LLP

(57) ABSTRACT

The present invention relates to a battery pack in which a plurality of unit modules consisting of battery cells are stacked, adjacently or in regular intervals, and electrode tabs are connected in series, and more specifically, to a battery pack including an overcurrent protector capable of preventing damage to each battery cell caused by a battery cell short circuit or overcurrent which flows in from a protection circuit by: connecting positive and negative electrode tabs of the battery cell with a voltage sensing line in order to sense the voltage of each battery cell; and installing a fuse in a connector which is arranged between the battery cell and the voltage sensing line and couples electrode tabs.

3 Claims, 6 Drawing Sheets

(51) Int. Cl.
  *H01M 10/48* (2006.01)
  *H01M 2/10* (2006.01)
  *H01M 10/42* (2006.01)

(56) References Cited

U.S. PATENT DOCUMENTS

| | | | | |
|---|---|---|---|---|
| 6,275,003 | B1* | 8/2001 | Marukawa | H01M 2/0245 320/107 |
| 7,538,516 | B2 | 5/2009 | Ha et al. | |
| 2006/0170394 | A1* | 8/2006 | Ha et al. | 320/107 |

FOREIGN PATENT DOCUMENTS

| | | |
|---|---|---|
| JP | 2009-231138 A | 10/2009 |
| JP | 2010-225449 A | 10/2010 |
| KR | 10-0876456 B1 | 12/2008 |

OTHER PUBLICATIONS

CN101084592 MT.*
International Search Report for corresponding International Application No. PCT/KR2012/003272.

* cited by examiner

BATTERY PACK INCLUDING OVERCURRENT PROTECTOR

TECHNICAL FIELD

The present invention relates to a battery pack in which a plurality of unit modules consisting of battery cells are stacked, adjacently or in regular intervals, and electrode tabs are connected in series, and more specifically, to a battery pack including an overcurrent protector capable of preventing damage to each battery cell caused by a battery cell short circuit or overcurrent which flows in from a protection circuit by: connecting positive and negative electrode tabs of the battery cell with a voltage sensing line in order to sense the voltage of each battery cell; and installing a fuse in a connector which is arranged between the battery cell and the voltage sensing line and couples electrode tabs.

BACKGROUND ART

In general, unlike a primary battery, research into a secondary battery, which may be charged and discharged and may be applied to various fields, such as a digital camera, a cellular phone, a notebook computer, and a hybrid car, has been actively conducted. An example of the secondary battery may include a nickel-cadmium battery, a nickel-metal hybrid battery, a nickel-hydrogen battery, and a lithium secondary battery.

Further, as a power source for an electric car or a hybrid car, the lithium secondary battery has been mainly used. Herein, since large power is required to drive a motor, and the like is required, a large-capacity battery pack in which a plurality of high-output battery cells or cell modules are connected to each other in series is generally used.

As described above, the battery pack is generally configured to include the plurality of battery cells which are connected to each other in series. In particular, in the case of the battery pack for the hybrid car, as several to several tens of battery cells are alternately charged and discharged, there is a need to keep and manage the battery in an appropriate operation state by controlling the charging and discharging, and the like.

Further, the battery pack has the plurality of battery cells disposed therein and the electrode tabs of each battery cell are electrically connected to each other by the connectors and the connectors are connected to protection circuits through the voltage sensing circuits so as to measure voltages of each electrode cell.

However, the battery pack according to the related art does not have a protector to block an overcurrent flowing in the voltage sensing lines, the protection circuits, and the like, in which the overcurrent protector may be damaged or short-circuited during a disposition operation of the voltage sensing lines even though the overcurrent protector is formed in the voltage sensing line.

Further, a technology of blocking an overcurrent from introduced into the battery pack according to the related art is disclosed and FIG. 1 illustrates the battery pack according to the related art.

The battery pack according to the related art is configured to include a case 10, an electrode plate assembly which is disposed in the case 10 and generates electric energy by an electrochemical reaction and includes a positive electrode plate, a negative electrode plate, and a separator, a positive electrode connection member 21 which is electrically connected to the positive electrode plate of the positive electrode plate assembly 20 to be delivered to a positive electrode terminal 30, and a negative electrode connection member which is electrically connected to the negative electrode plate of the electrode plate assembly to deliver the electric energy to a negative electrode terminal 40.

In this case, the fuses 50 may be detached and attached between the positive electrode terminal 30 and the positive electrode connection member 21 or between the negative electrode terminal 40 and the negative electrode connection member, such that the damage of the battery pack due to the short circuiting of the electrode plate assembly or the introduction of the overcurrent may be prevented.

However, the battery pack according to the related art as described above has a complicated structure and thus is not easily manufactured and a contact part between the positive electrode connection member 21 and the fuse 50 or the positive electrode terminal 30 and the fuse 50 is separated from each other due to vibration or impact and thus the short-circuiting therebetween may occur.

Further, since the fuse 50 is connected to the electrode terminals 30 and 40, the fuse does not serve to protect each cell when short-circuiting or abnormality occurs in each cell of the electrode plate assembly 20.

DISCLOSURE

Technical Problem

An object of the present invention is to provide a battery pack in which a plurality of unit modules consisting of battery cells are stacked, adjacently or in regular intervals, and electrode tabs are connected in series, and more specifically to a battery pack including an overcurrent protector capable of preventing damage to each battery cell caused by a battery cell short circuit or overcurrent which flows in from a protection circuit by: connecting positive and negative electrode tabs of the battery cell with a voltage sensing line in order to sense the voltage of each battery cell; and installing a fuse in a connector which is arranged between the battery cell and the voltage sensing line and couples electrode tabs.

Another object of the present invention is to provide a battery pack including an overcurrent protector which has a simple structure and is miniaturized and is not damaged or short-circuited during a disposition operation of voltage sensing lines, by installing fuses preventing an overcurrent in connectors connected to electrode tabs of battery cells.

Technical Solution

In one general aspect, there is provided a battery pack including an overcurrent protector, including: a plurality of battery cells 100 having a pair of electrode tabs 110 configured of a positive electrode tab 111 and a negative electrode tab 112 each disposed at sides thereof and arranged in parallel; a connector 200 interposed between the electrode tabs 110 of the battery cells 100 adjacent to each other and having a connection member 220 electrically connecting the electrode tabs 110; a voltage sensing line 300 connected to one side of the connector 200; and a fuse 400 disposed in the connector 200 and having one side connected to the connection member 220 of the connector 200 and the other side connected to the voltage sensing line 300 to electrically connect the electrode tab 110 of the battery cell 100 to the voltage sensing line 300.

The battery pack including an overcurrent protector may include: a case 500 interposed between the battery cells 100 and having the connector 200 coupled with one side thereof;

and a pair of end covers 600 supporting outer sides of outermost battery cells 100 among the battery cells 100.

The connector 200 may be provided with an insertion groove 230 in which the fuse 400 is fixed.

The connector 200 may have a pair of holders 240 formed at both sides of the insertion groove 230 and the holders 240 may be each electrically connected to the connection member 220 of the connector 200 and the voltage sensing line 300.

The holder 240 may have a fixed groove 241 disposed at an upper portion thereof so that the fuse 400 is fixedly inserted into the fixed groove 241.

Advantageous Effects

According to the exemplary embodiments of the present invention, in a battery pack in which a plurality of unit modules consisting of battery cells are stacked, adjacently or in regular intervals, and electrode tabs are connected in series, more specifically, a battery pack including an overcurrent protector may prevent damage to each battery cell caused by a battery cell short circuit or overcurrent which flows in from a protection circuit by: connecting positive and negative electrode tabs of the battery cell with a voltage sensing line in order to sense the voltage of each battery cell; and installing a fuse in a connector which is arranged between the battery cell and the voltage sensing line and couples electrode tabs.

Further, the battery pack including an overcurrent protector has the simple structure, is less likely to be damaged or short-circuited during the disposition operation of the voltage sensing lines, and does not require the additional space due to the application of the fuse to be miniaturized, by installing the fuses preventing the overcurrent in the connectors connected to the electrode tabs of the battery cells.

BEST MODE

Hereinafter, a battery pack including an overcurrent protector according to exemplary embodiments of the present invention will be described in detail with reference to the accompanying drawings.

Figure 1:
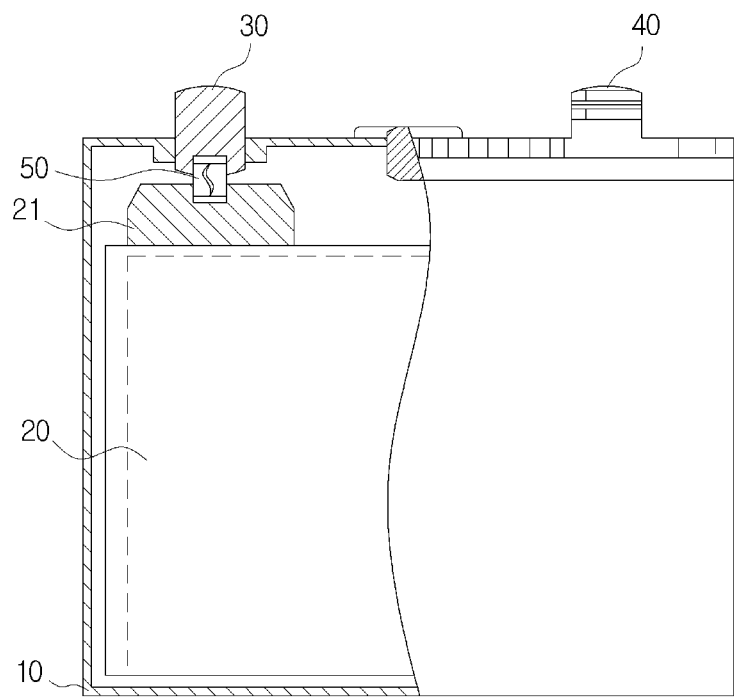
FIG. 1 is a schematic diagram illustrating a structure to prevent an overcurrent of a battery pack according to the related art.
Figure 2:
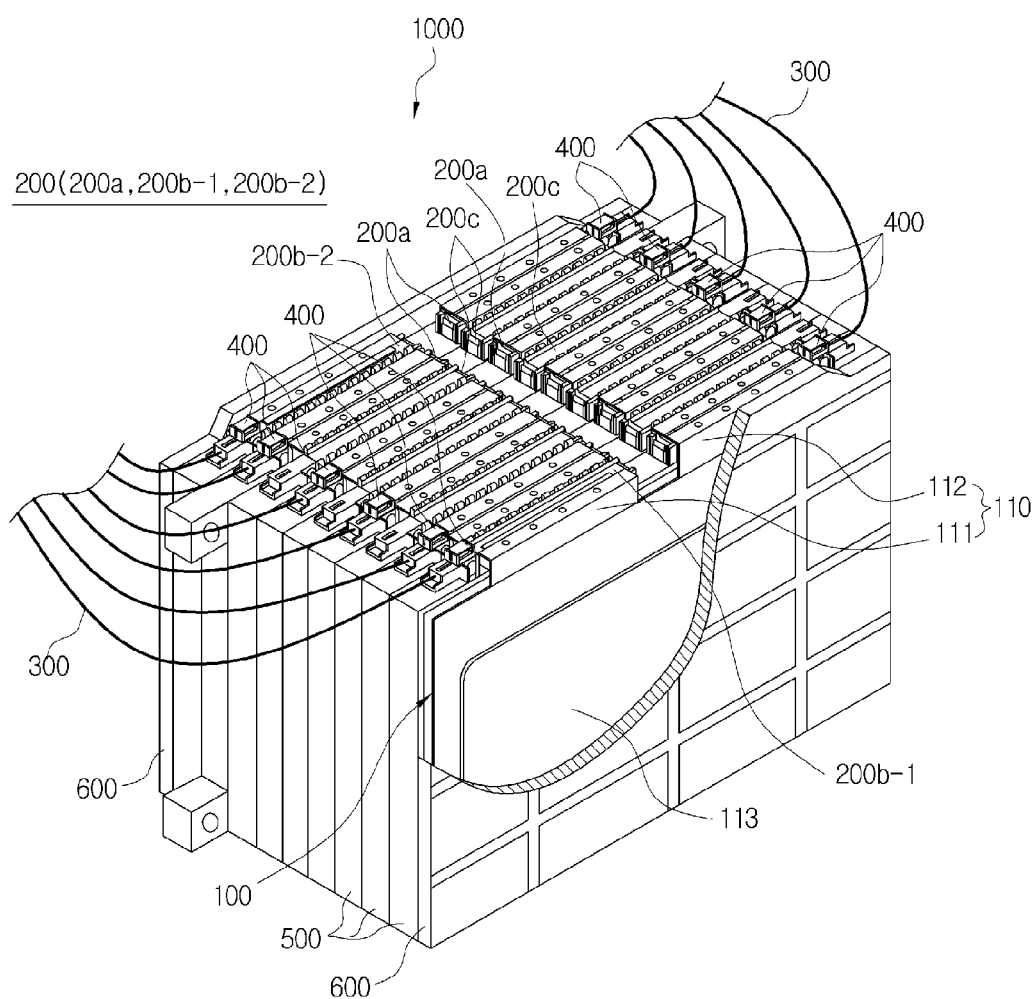
FIG. 2 is a perspective view illustrating a battery pack including an overcurrent protector according to an exemplary embodiment of the present invention.

FIG. 2 is a perspective view illustrating a battery pack including an overcurrent protector according to an exemplary embodiment of the present invention.

As illustrated in FIG. 2, the battery pack including the overcurrent protector according to the exemplary embodiment of the present invention is configured to include a plurality of battery cells 100 which have a pair of electrode tabs 110 each configured of a positive electrode tab 111 and a negative electrode tab 112 disposed at sides thereof and are arranged in parallel, a connector 200 which is interposed between the electrode tabs 110 of the battery cells 110 adjacent to each other and has a connection member 220 electrically connecting the electrode tabs 110, a voltage sensing line 300 which is connected to one side of the connector 200, and a fuse 400 which is disposed in the connector 200 and has one side connected to the connection member 220 of the connector 200 and the other side connected to the voltage sensing line 300 to electrically connect the voltage sensing lines 300 to the electrode tabs 110 of the battery cells 100.

First, the battery cell 100 is provided with the electrode tab 110 which makes electricity flow in one side of an electrode assembly 113 which is a part configured of the positive electrode, the negative electrode, an electrolyte, a separator, and the like to generate electricity.

The electrode tab 110 is configured of the positive electrode tab 111 and the negative electrode tab 112 and is preferably made of a metal material which is an electrical conductor and a flexible material which is easily bent.

Figure 3:
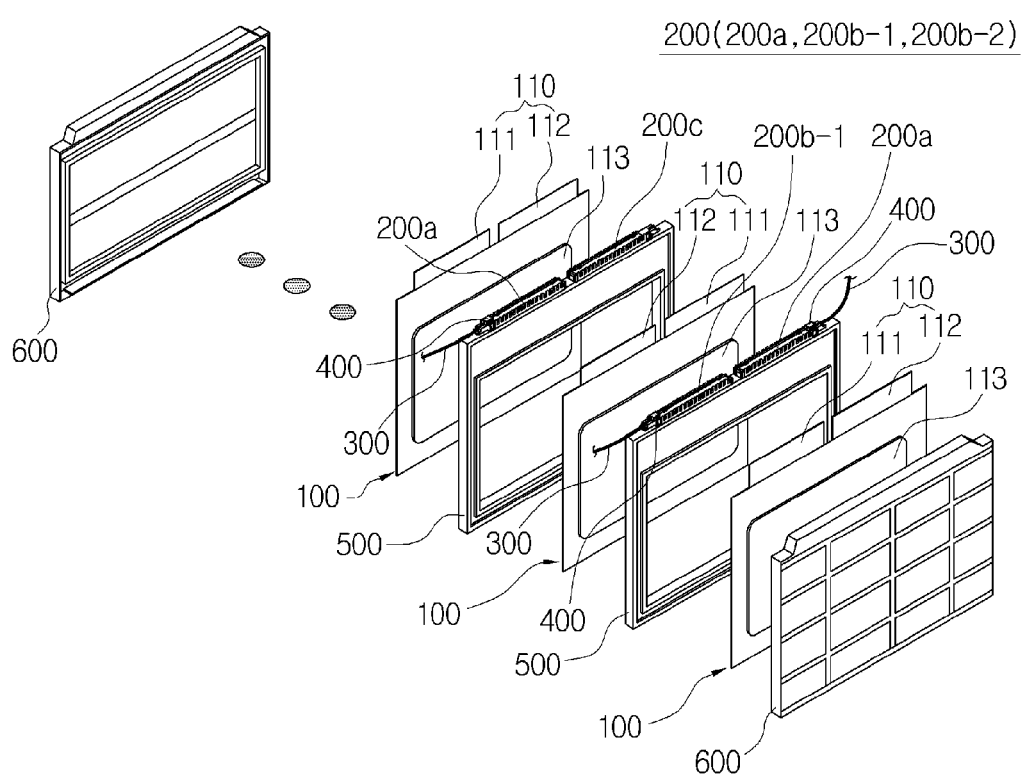
FIG. 3 is an exploded perspective view illustrating the battery pack including the overcurrent protector according to the exemplary embodiment of the present invention.

Further, as illustrated in FIG. 3, the plurality of battery cells 100 are disposed in parallel at a predetermined interval and the connector 200 is interposed between the electrode tabs 110 of the battery cells 100 adjacent to each other.

In this case, the battery cells 100 adjacent to each other are alternately disposed to make the positive electrode tab 111 and the negative electrode tab 112 face each other and the connector 200 is interposed therebetween.

Figure 4:
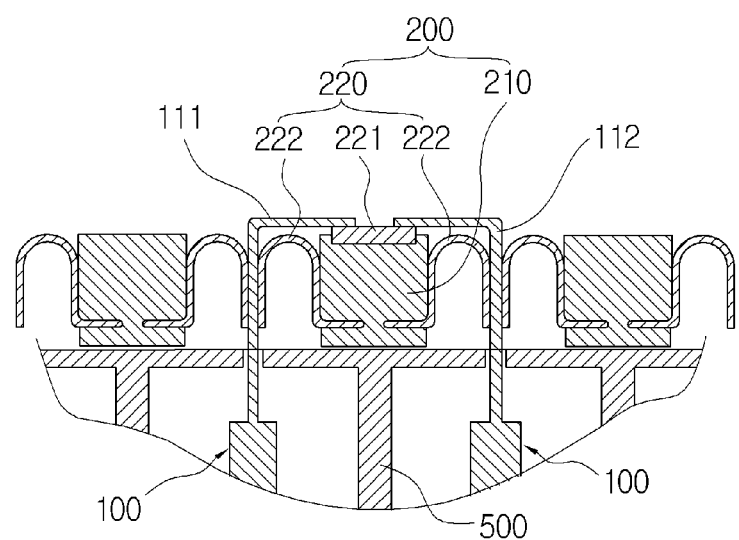
FIG. 4 is a schematic cross-sectional view illustrating an electrode tab and a connector according to an exemplary embodiment of the present invention.

Further, as illustrated in FIG. 4, the positive electrode tab 111 and the negative electrode tab 112 of the battery cells 100 adjacent to each other are bent toward a first connection member 221 and then are coupled with each other by laser or ultrasonic welding so that the positive electrode tab 111 and the negative electrode tab 112 contact the first connection member 221 disposed on an upper surface of the connector 200 to conduct each other.

Figure 5:
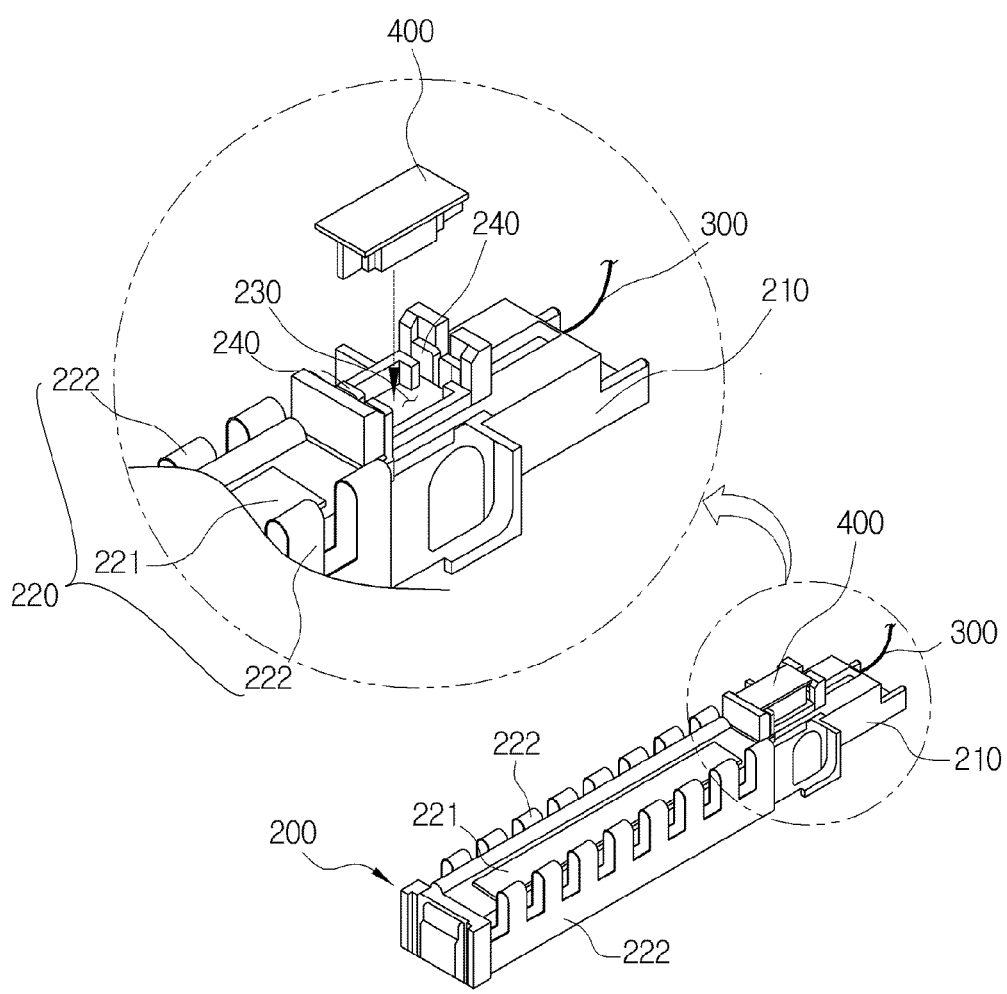
FIG. 5 is a perspective view illustrating the connector and a fuse according to the exemplary embodiment of the present invention.

Further, as illustrated in FIG. 5, the connector 200 may be configured to include a body of which the one side is connected to the voltage sensing line 300, the first connection member 221 disposed on an upper surface of the body 210, and a pair of second connection members 222 which is coupled with both surfaces of the body 210.

The body 210 may be preferably made of a plastic material not to conduct electricity and since the first connection member 221 is coupled with the electrode tab 110 of the battery cell 110 by welding, and the like, the body 210 may be preferably made of the same material and may be made of the metal material to conduct electricity well.

Further, the pair of second connection members 222 are configured not to be connected to each other and each second connection member 222 is an electrical conductor and may be preferably made of metal which is a U-letter shape and has elasticity.

In this case, however, only one connector 200 is interposed between the electrode tabs 110 of the pair of battery cells 100 adjacent to each other.

That is, since the pair of battery cells 100 facing each other is provided with two pairs of electrode tabs 110 to make the positive electrode tabs 111 and the negative electrode tabs 112 face each other, the connector 200 is interposed between the pair of electrode tabs 110 so that the pair of electrode tabs 110 is coupled with the first connection member 221 of the connector 200.

Further, the rest pair of electrode tabs 110 is again coupled with the first connection member 221 of the connector 200 which is interposed between the electrode tabs 110 of the battery cell 100 adjacent to each other.

Therefore, the connectors 200 are interposed between the plurality of battery cells 100 in a zigzag form and the electrode tabs 110 may be connected to each other in series.

In this case, the connectors 200 adhere to the electrode tabs 110 by the U-shaped second connection members 222 disposed at both sides thereof and are coupled with a cover to cover the upper and side surfaces of the connector 200, thereby protecting the coupled electrode tabs 110.

Further, as described above, when the electrode tabs 110 are coupled with each other, portions at which the connectors 200 are not interposed between the electrode tabs 110 of the plurality of battery cells 100 are present. Herein, as illustrated in FIG. 2, a fixed connector 200c at which the first connection member 221 is not formed is interposed between the electrode tabs 110 to serve to adhere and fix the electrode tabs 110 in the state in which the electrode tabs 110 are not electrically connected to each other.

That is, each connector 200 is interposed between the two pairs of electrode tabs 110 of the battery cells 100 facing each other and a connection connector 200a formed with the first connection member 221 is interposed between the pair of electrode tabs 110 to couple the electrode tabs 110 with each other, such that the electrode tabs 110 are coupled with each other by being bent inwardly of the connection connector 200a and the fixed connector 200c which are not coupled with the electrode tabs 110 and serves only to adhere the electrode tabs 110 outwardly is interposed between another pair of the electrode tabs 110.

In this case, the fixed connector 200c serves only to adhere to the electrode tab 100 and is not connected with the voltage sensing line 300.

Further, the battery cell 100 disposed at the outermost side is provided with only one tab (positive electrode tab or negative electrode tab), which is interposed between end connector 200b-1 or 200b-2 and connected to the end connector 200b-1 or 200b-2.

That is, the connection connector 200a and the end connectors 200b-1 or 200b-2 are interposed between the electrode tabs 110 of the outermost electrode cell 100 and the electrode cell 100 adjacent thereto, such that the pair of electrode tabs 110 and the one electrode tab 110 are each coupled with the connection connector 200a and the first connection member 221 of the end connector 200b-1 or 200b-2.

In this case, the first connection member 221 of the end connector 200b-1 or 200b-2 needs to be configured so as not to contact the second connection member 222.

Further, one side of the connector 200 is connected with the voltage sensing line 300 and the voltage sensing line 300 is connected to the first connection member 221 of the connector 200.

That is, the voltage sensing line 300 is connected to the connector 200 to be electrically connected the electrode tab 110 of the electrode cell 100.

Figure 6:
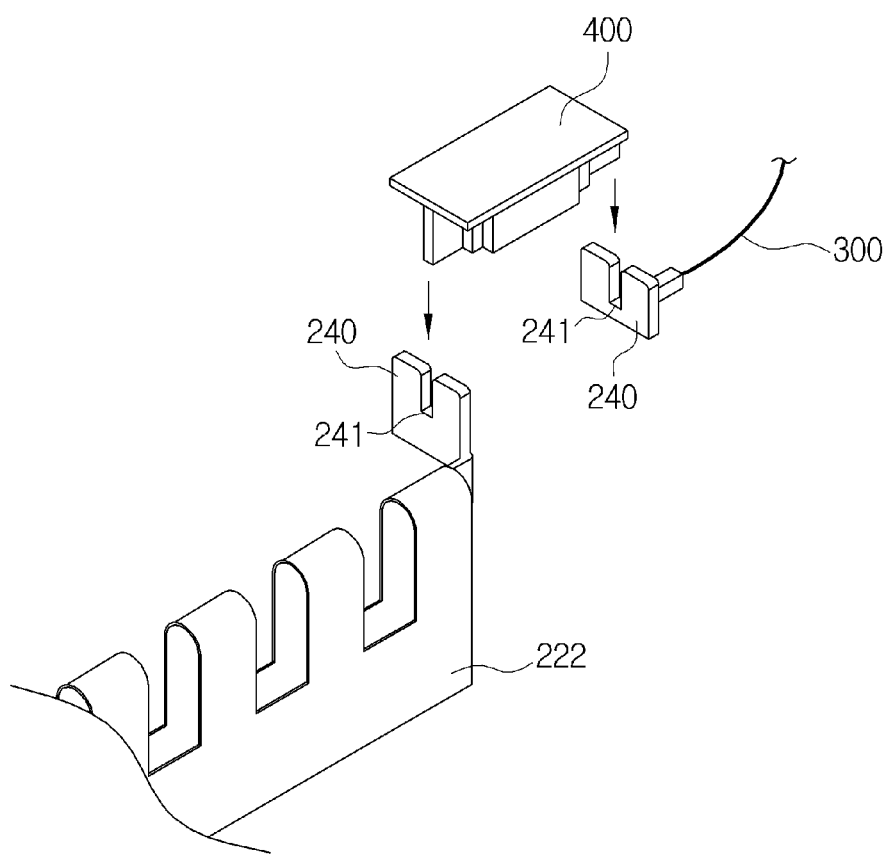
FIG. 6 is an exploded perspective view illustrating a holder of the connector and the fuse according to the exemplary embodiment of the present invention.

In this case, since the connector 200 adheres to the electrode tabs 110 by the second connection member 220, such that the second connection member 220 and the electrode tabs 110 are configured to be conducted, as illustrated in FIG. 6, the voltage sensing line 300 may be configured to be connected to the second connection member 220.

Herein, the fuse 400 is disposed in the connector 200 and has one side connected to the connection member 220 of the connector 200 and the other side connected to the voltage sensing line 300 to electrically connect the electrode tabs 110 of the battery cell 100 to the voltage sensing lines 300.

The electrode tabs 110 are coupled with the connection member 220 of the connector 200, the one side of the fuse 400 is connected to the one side of the connection member 220, and the other side of the fuse 400 is connected to the voltage sensing line 300.

In this case, as illustrated in FIG. 5, the fuse 400 is not formed on the voltage sensing line 30 but is fixed to the one side of the connector 200, such that both sides of the fuse 400 are each connected to the connection member 220 of the connector 200 and the voltage sensing line 300.

Further, the voltage sensing line 300 is connected to a protection circuit and a battery management system (BMS) which are disposed at one side or outside of the battery pack to flow a current charging and discharging the battery cell 100, thereby sensing a voltage and a current.

Therefore, in order to sense the voltages of each battery cell 100, the positive electrode tab 111 and the negative electrode tab 112 of the battery cell 100 are connected to each other by the voltage sensing line 300 and the fuse 400 is disposed in the connector 200 which is disposed between the battery cells 100 and the voltage sensing line 300 and couples the electrode tabs 110, such that when the short-circuit occurs in the battery cell 100, the external circuit sensing the voltage of the battery pack is short-circuited, or the overcurrent is introduced from the protection circuit, the fuse 400 is short-circuited to block a current, thereby preventing the battery cell 100 from being damaged.

Further, the battery pack may have a simple structure, may be less likely to be damaged or short-circuited during the disposition operation of the voltage sensing line 300, may not require the additional space due to the application of the fuse 400, and may be miniaturized, by disposing the fuse 400 to prevent the overcurrent in the connector 200 connected to the electrode tab 110 of the battery cell 100.

Further, the battery pack including the overcurrent protector may be configured to further include a case 500 which is interposed between the battery cells 100 and has one side connected to the connector 200 and a pair of end covers 600 which supports an outer side of the outermost battery cell 100 among the battery cells.

As illustrated in FIG. 3, the battery cells 100 are stacked by having the case 500 disposed therebetween and the outer side of the battery cell 100 disposed at the outermost side is provided with the end cover 600, and the pair of end covers 600 is fixed by a fastening member to support the battery cells 100, such that the electrode assembly 113 of the battery cell 100 may be enclosed by the case 500 and the electrode tabs 110 may be coupled with each other to protrude upwardly of the case 500.

In this case, the case 500 has the connector 200 coupled with an upper portion thereof to be disposed between the electrode tabs 110, such that the case 500 may serve to support the battery cell 100 and the connector 200.

Herein, after the electrode tabs 110 are coupled with the connector 200, a bus bar may be coupled thereto to be connected to the one electrode tab 110 to form the electrode at one side of the battery pack on the upper portion of the bus bar and an upper cover is disposed on the upper portion of the bus bar to be coupled with the case 500 or the end cover 600.

In the battery pack including the overcurrent protector according to the exemplary embodiment of the present invention configured as described above, the fuse 400 serving to prevent the overcurrent from flowing in the battery cell 100 may be disposed in the connector 200 in various forms and the connector 200 may be formed in various forms and the exemplary embodiment thereof will be described below.

The connector 200 is provided with an insertion groove 230 as illustrated in FIG. 5, such that the fuse 400 may be formed to be fixed in the insertion groove 230.

That is, the insertion groove 230 is formed in the connector 200 so as to correspond to the shape of the fuse 400 and the fuse 400 is inserted into the insertion groove 230, such that the one side of the fuse 400 may be connected to the connection member 220 of the connector 200 and the other side of the fuse 400 may be connected to the voltage sensing line 300.

In this case, the connector 200 has a pair of holders 240 formed at both sides of the insertion groove 230 and each holder 240 is configured to be electrically connected to the connection member 220 of the connector 200 and the voltage sensing line 300 to insert the fuse 400 between the holders 240.

In this case, the one holder 240 may be integrally formed to be connected to the one side of the second connection member 222 of the connector 200, and the other holder 240 is formed in an 'L'-letter shape to be easily connected to the voltage sensing line 300, such that a vertical portion thereof may be connected to the fuse 400 and a horizontal portion thereof may be connected to the voltage sensing line 300.

Further, as illustrated in FIG. 6, the holder 240 has a fixed groove 241 disposed at an upper portion thereof, such that the fuse 400 is fixedly inserted into the fixed groove 241.

Therefore, the fuse 400 is easily assembled in the connector 200 and at the time of the short-circuiting of the fuse 400 due to the overcurrent, the replacement is conveniently performed.

Further, since the fuse 400 is certainly fixed to the holder 240, the movement and separation of the fuse 400 due to the vibration or the external impact are prevented, such that the electrical short-circuiting between the fuse 400 and the holder 240 may be prevented.

Further, although the exemplary embodiment of the present invention illustrates a configuration in which the plurality of battery cells 100 are connected to each other in series, the plurality of battery cells 100 may be connected to each other in parallel or the plurality of battery packs may be coupled with each other.

The present invention is not limited to the above-mentioned exemplary embodiments but may be variously applied, and may be variously modified by those skilled in the art to which the present invention pertains without departing from the gist of the present invention claimed in the claims.

[Description of Reference Numerals]

1000: Battery pack including overcurrent protector (of the present invention)
100: Battery cell
110: Electrode tab  111: Positive electrode tab
112: Negative electrode tab  113: Electrode assembly
200: Connector  200a: Connection connector
200b-1, 200b-2: End connector  200c: Fixed connector
210: Body  220: Connection member
221: First connection member  222: Second connection member
230: Insertion groove  240: Holder
241: Fixed groove
300: Voltage sensing line
400: Fuse
500: Case
600: End cover

The invention claimed is:

1. A battery pack including an overcurrent protector, comprising:
a plurality of battery cells (100) having a pair of electrode tabs (110) configured of a positive electrode tab (111) and a negative electrode tab (112) each disposed at sides thereof and arranged in parallel;
a connector (200) interposed between the electrode tabs (110) of the battery cells (100) adjacent to each other and having a connection member (220) electrically connecting the electrode tabs (110);
a voltage sensing line (300) connected to one side of the connector (200); and
a fuse (400) disposed in the connector (200) and having one side connected to the connection member (220) of the connector (200) and the other side connected to the voltage sensing line (300) to electrically connect the electrode tab (110) of the battery cell (100) to the voltage sensing line (300)
wherein
the connector (200) is provided with an insertion groove (230) in which the fuse (400) is fixed, and
the connector (200) has a pair of holders (240) formed at both sides of the insertion groove (230) and the holders (240) are each electrically connected to the connection member (220) of the connector (200) and the voltage sensing line (300).

2. The battery pack of claim 1, further comprising:
a case (500) interposed between the battery cells (100) and having the connector (200) coupled with one side thereof; and
a pair of end covers (600) supporting outer sides of outermost battery cells (100) among the battery cells (100).

3. The battery pack of claim 1, wherein the holder (240) has a fixed groove (241) disposed at an upper portion thereof so that the fuse (400) is fixedly inserted into the fixed groove (241).

* * * * *